(12) United States Patent
Azad et al.

(10) Patent No.: US 11,947,409 B2
(45) Date of Patent: Apr. 2, 2024

(54) PARITY PROTECTION OF CONTROL REGISTERS BASED ON REGISTER BIT POSITIONS

(71) Applicant: XILINX, INC., San Jose, CA (US)

(72) Inventors: Sarosh I. Azad, Fremont, CA (US); Aditi R. Ganesan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 144 days.

(21) Appl. No.: 17/574,340

(22) Filed: Jan. 12, 2022

(65) Prior Publication Data

US 2023/0222026 A1 Jul. 13, 2023

(51) Int. Cl.
*G06F 11/10* (2006.01)
*G06F 11/07* (2006.01)

(52) U.S. Cl.
CPC ...... *G06F 11/0751* (2013.01); *G06F 11/0772* (2013.01); *G06F 11/1004* (2013.01)

(58) Field of Classification Search
CPC ............. G06F 11/0772; G06F 11/0751; G06F 11/1004
See application file for complete search history.

(56) References Cited

U.S. PATENT DOCUMENTS

| | | | | |
|---|---|---|---|---|
| 4,651,321 A | * | 3/1987 | Woffinden | G06F 11/1012 714/763 |
| 5,335,235 A | * | 8/1994 | Arnott | H03M 13/098 714/E11.053 |
| 5,448,725 A | * | 9/1995 | Gervais | G06F 11/0721 714/47.1 |
| 6,591,394 B2 | * | 7/2003 | Lee | G06F 11/1072 714/766 |
| 7,257,763 B1 | | 8/2007 | Srinivasan et al. | |
| 2006/0050576 A1 | * | 3/2006 | Kim | G11C 29/52 714/E11.038 |
| 2012/0331339 A1 | * | 12/2012 | Schmidt | G05B 9/02 714/15 |
| 2017/0075760 A1 | | 3/2017 | Özer et al. | |
| 2017/0346504 A1 | * | 11/2017 | Johar | H03M 13/2909 |
| 2018/0121282 A1 | * | 5/2018 | Barrilado Gonzalez | G06F 3/064 |
| 2019/0227867 A1 | * | 7/2019 | Ellur | H03M 13/098 |

* cited by examiner

*Primary Examiner* — Joseph O Schell
(74) *Attorney, Agent, or Firm* — Patterson + Sheridan, LLP

(57) ABSTRACT

An integrated circuit (IC) device for detecting errors within a register, the IC device includes registers and parity checking circuitry. The parity checking circuitry is coupled to the registers and comprises a first parity circuitry, a second parity circuit, and error detection circuitry. The first parity circuit receives first register values from the registers and determine a first value from the first register values. The second parity circuit is receives second register values from the registers and determines a second value from the second register values. The error detection circuitry compares the first value and the second value to detect a first error within the registers, and output an error signal indicating the first error.

20 Claims, 5 Drawing Sheets

US 11,947,409 B2

PARITY PROTECTION OF CONTROL REGISTERS BASED ON REGISTER BIT POSITIONS

TECHNICAL FIELD

Examples of the present disclosure generally relate to detecting invalid register values, and, more particularly, using parity circuitry to detect invalid register values.

BACKGROUND

In applications that require a high level of operating safety, integrated circuit (IC) devices are required to meet safety operating standards. Such applications correspond to operating environments where failure of an IC device may place an operator in a dangerous situation. One example of such applications is automotive applications. In automotive applications, IC devices are required to meet one of the Automotive Safety Integrity Levels specified in the ISO 26262 standard. For example, IC devices are required to meet an ASIL-D standard that requires 99 percent of random faults to be detectable (e.g., Single Point Fault Metric (SPFM)). In various implementations, different IC devices are able to achieve 99 percent SPFM through the application of monitoring techniques. In some implementations, IC devices employ software monitoring to periodically check the register values of an IC device to determine the validity of the register values. However, as software monitoring techniques periodically check the validity of the register values, a change to one or more of the register values may go undetected until after operation of the IC device has been negatively affected. Further, software monitoring solutions use processing resources of the IC device, reducing the amount of processing resources that are available to an application or applications running on the IC device.

SUMMARY

Integrated circuit (IC) devices include hardware-based techniques that detect erroneous value changes (e.g., invalid values) to the values of control registers of the IC devices. Hardware-based technique can continuously monitor the control registers such that erroneous value changes are detected before operation of the IC device is adversely affected. In one example, the IC device includes parity checking circuitry that monitors the values of the control registers of the IC device and reports detected errors within the control registers. The parity checking circuitry generates parity values for subsets of the registers and uses the parity values to detect any errors that are within the values of the control registers.

In one example, an IC device for detecting errors within a register, the IC device includes registers and parity checking circuitry. The parity checking circuitry is coupled to the registers and comprises a first parity circuitry, a second parity circuit, and error detection circuitry. The first parity circuit receives first register values from the registers and determine a first value from the first register values. The second parity circuit is receives second register values from the registers and determines a second value from the second register values. The error detection circuitry compares the first value and the second value to detect a first error within the registers, and output an error signal indicating the first error.

In one example, a method comprising determining, by a first parity circuit of parity checking circuitry of an IC device, a first value from first register values of a plurality of registers of the IC device. The method further includes determining, by a second parity circuit of the parity checking circuitry, a second value from second register values of the plurality of registers. Further, the method includes comparing the first and second values to determine a first error within the plurality of registers, and outputting an error signal indicative of the first error.

In one example, parity checking circuitry includes a first parity circuit, a second parity circuit, and error detection circuitry. The first parity circuit receives first register values from a plurality of registers, and determines a first value from the first register values. The second parity circuit receives second register values from the plurality of registers, and determines a second value from the second register values. The error detection circuitry compares the first value and the second value to determine a first error within the plurality of registers, and outputs an error signal indicating the first error.

BRIEF DESCRIPTION OF THE DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
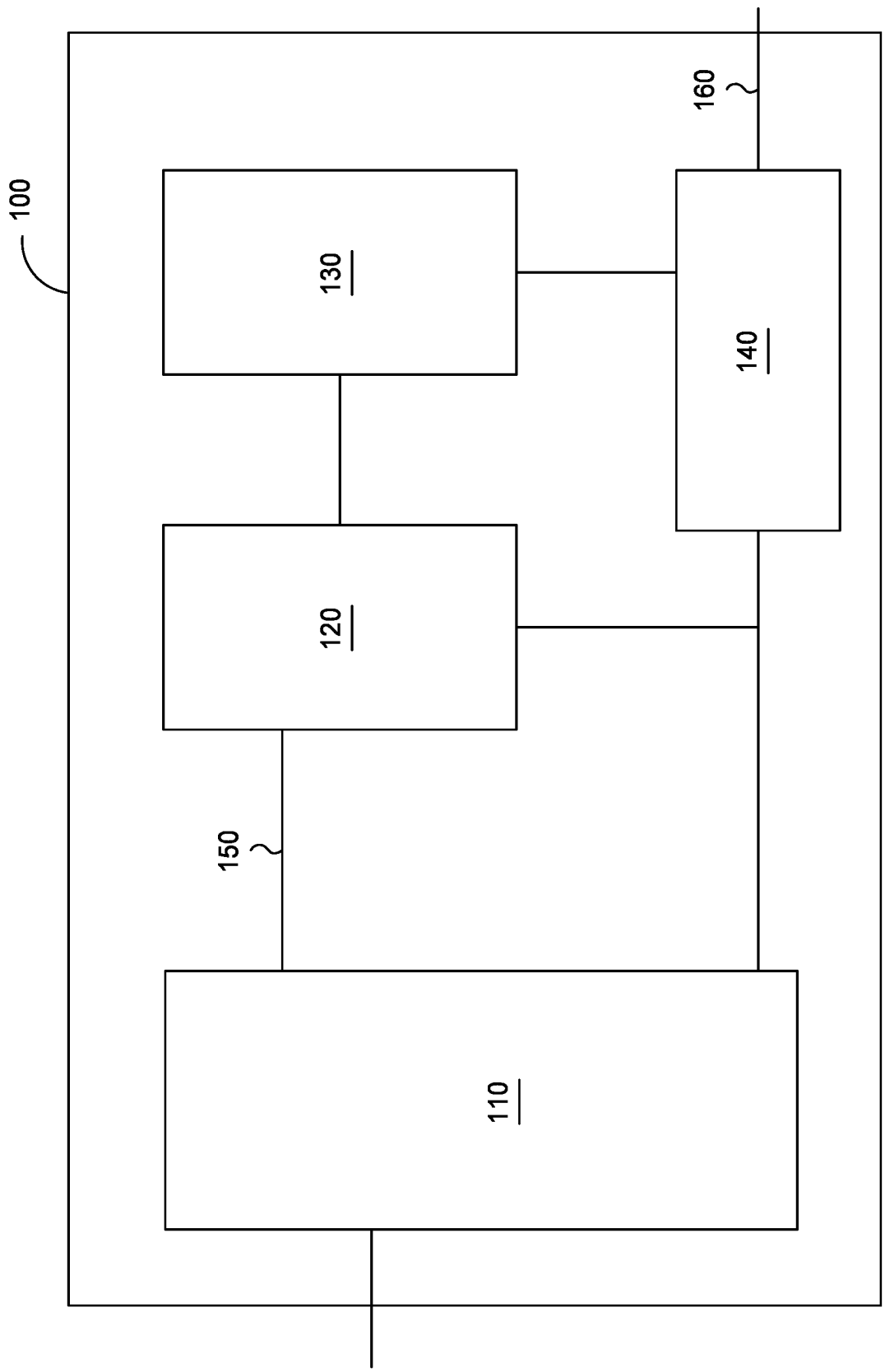
FIG. 1 is a schematic diagram of an integrated circuit device, according to an example.

Integrated circuit (IC) devices include registers, the values of which may control the operation of the IC devices. Such registers may be referred to as control registers. As the values of the registers change, the operation of the IC device is changed. In some examples, an application running on the IC device alters one or more values of the registers to configure or change the operation of the IC device. However, in other examples, a value of one or more of the registers may be erroneously changed. Erroneously changing a value of a register may result in a value of a register having an unintended value, negatively altering the operation of the IC device. A value of a register may be erroneously changed due to a defect within the corresponding IC device, a single-event upset (SEU) within the registers, or an incorrect (e.g., unintended) write to the registers. An SEU changes the value of a register due to incident electrical effects within the circuit elements of the registers. An incorrect write corresponds to data that was routed to the wrong register.

A register having an invalid value may alter the operation of the corresponding IC device. Altering the operation the IC device may lead to a failure within the corresponding system. In systems where an operator's safety may be placed in danger due to a failure, detecting invalid values within the registers ensures that operation of the IC device is not changed, reducing the probability that failures will occur within the corresponding system and increasing the safety of the operator.

In the following, an IC device including parity checking circuitry that monitors the values of the registers is described. The parity checking circuitry uses a hardware-based technique that detects erroneously changed register values. The parity checking circuitry receives register values from subsets of the registers, and uses a parity calculation to determine whether or not errors are present within the values of the registers. As the parity checking circuitry uses a hardware-based technique to monitor the register values, processing resources of the corresponding device are not dedicated to monitoring the register values. Further, the parity checking circuitry is able to continuously monitor the values of the registers. Accordingly, the processing resources available to applications running on the IC device are increased, and the invalid register values are detected more quickly, as compared to IC devices that employ software monitoring techniques.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 illustrates an IC device 100, according to one or more examples. The IC device 100 includes a controller 110, control circuitry 120, a register block 130, parity checking circuitry 140, and an interconnect 150. The IC device 100 may be a programmable logic device, such as a field programmable gate array (FPGA). In other examples, the IC device 100 is an application specific IC (ASIC), central processing unit (CPU), or a graphics processing unit (GPU), among others. In one or more examples, the IC device 100 is a system-on-chip (SoC). Further, the IC device 100 includes one or more IC chips. In various examples, the IC device 100 includes programmable logic and hardened control circuitry. The programmable logic may be reprogrammed via control data (e.g., bit stream) to change the functionality of the programmable logic, while the functionality of the hardened control circuitry remains constant.

The controller 110 communicates with the control circuitry 120 via the interconnect 150. The interconnect 150 may be an Advanced eXtensible Interface (AXI) interconnect. In other examples, the interconnect 150 is another type of interconnect. The controller 110 provides instructions and data to the control circuitry 120 to update a value of one or more registers of the register block 130. Further, the controller 110 provides instructions to the control circuitry 120 to read a value of one or more registers of the register block 130. In one example, the controller 110 executes instructions stored within a memory to perform one or more corresponding functions. The instructions correspond to an application, and the functions correspond to one or more actions performed by the IC device based on the application. For example, the application may correspond to monitoring the sensor data received from a sensor device of an automobile.

The register block 130 may be referred to as a control register block. The register block 130 includes one or more registers (e.g., control registers), each having one or more corresponding register values. In one example, the number of registers within the register block 130 is N. N is a positive integer greater than one. In other examples, N is 16, 32, 64, 128, 256, or more. Each register within the register block is an M-bit register. M is a positive integer greater than one. In one example, M is 16, 32, 64, 128, 256, or more. Each of the registers within the register block 130 includes a plurality of flip flops that each store a corresponding register value. The flip flops are disposed in a plurality of rows and columns. Each row of flip flops corresponds to a different register within the register block 130. Further each flip flop stores a corresponding bit (e.g., register value) of a corresponding register.

The register block 130 is connected to and controlled by the control circuitry 120. For example, the register block 130 may receive read commands, write commands, and data from the controller 110 via the interconnect 150, and the control circuitry 120.

The parity checking circuitry 140 is connected to the register block 130. Further, the parity checking circuitry 140 is connected to one or more of the control circuitry 120 and the controller 110. The parity checking circuitry 140 receives register values from the register block 130 and determines whether one or more of the values of the register block 130 contains an invalid value. An invalid value is indicative that a value within the register block 130 differs from an expected value and was erroneously changed.

The parity checking circuitry 140 outputs an error signal 160 based on the detection of an invalid value within the register block 130. A value of the register block 130 may be changed due to a defect within the IC device 100, a SEU within the register block 130, or an incorrect (e.g., unintended) write to one of the registers. The parity checking circuitry 140 outputs the error signal 160 from the IC device 100 to a processing system which is configured to take one or more corrective actions based on the error signal 160. For example, a processing system may reset the IC device 100, halt an application running on the IC device 100, or reset the register block 130, among other actions based on the error signal 160 indicating an invalid register value (e.g., an error).

The parity checking circuitry 140 receives a monitor signal from the controller 110 or the control circuitry 120. The monitor signal (also referred to as a "monitor enable signal") is asserted to indicate to the parity checking circuitry 140 to monitor the values of the register block 130. The monitor signal is deasserted to indicate to the parity checking circuitry 140 to stop (or pause) monitoring one or more registers within the register block 130. In one example, the monitor signal is deasserted when one or more of the values of the register block 130 are updated. The monitor signal corresponding to the register to be updated is deasserted, while the monitor signals corresponding to the registers that are not to be updated are asserted. In one example, the controller 110 or the control circuitry 120 determines that a register value is to be updated and deasserts the corresponding monitor signal to pause (e.g., stop) the parity checking circuitry 140 from monitoring the to-be-updated registers of the register block 130. In other examples, a single monitoring signal is used to control the monitoring operation of the parity checking circuitry 140. In such examples, based on the monitoring signal being deasserted, the parity checking circuitry 140 pauses monitoring of the entire register block 130.

In FIG. 1, the IC device 100 is illustrated as including one register block 130. In other examples, the IC device 100 includes two or more register blocks. In one example, the IC device includes N register blocks, where N is three or more. Further, in such examples, each register block may be monitored by a corresponding parity checking circuitry 140, such that the IC device 100 includes more than one parity checking circuitry 140.

Figure 2:
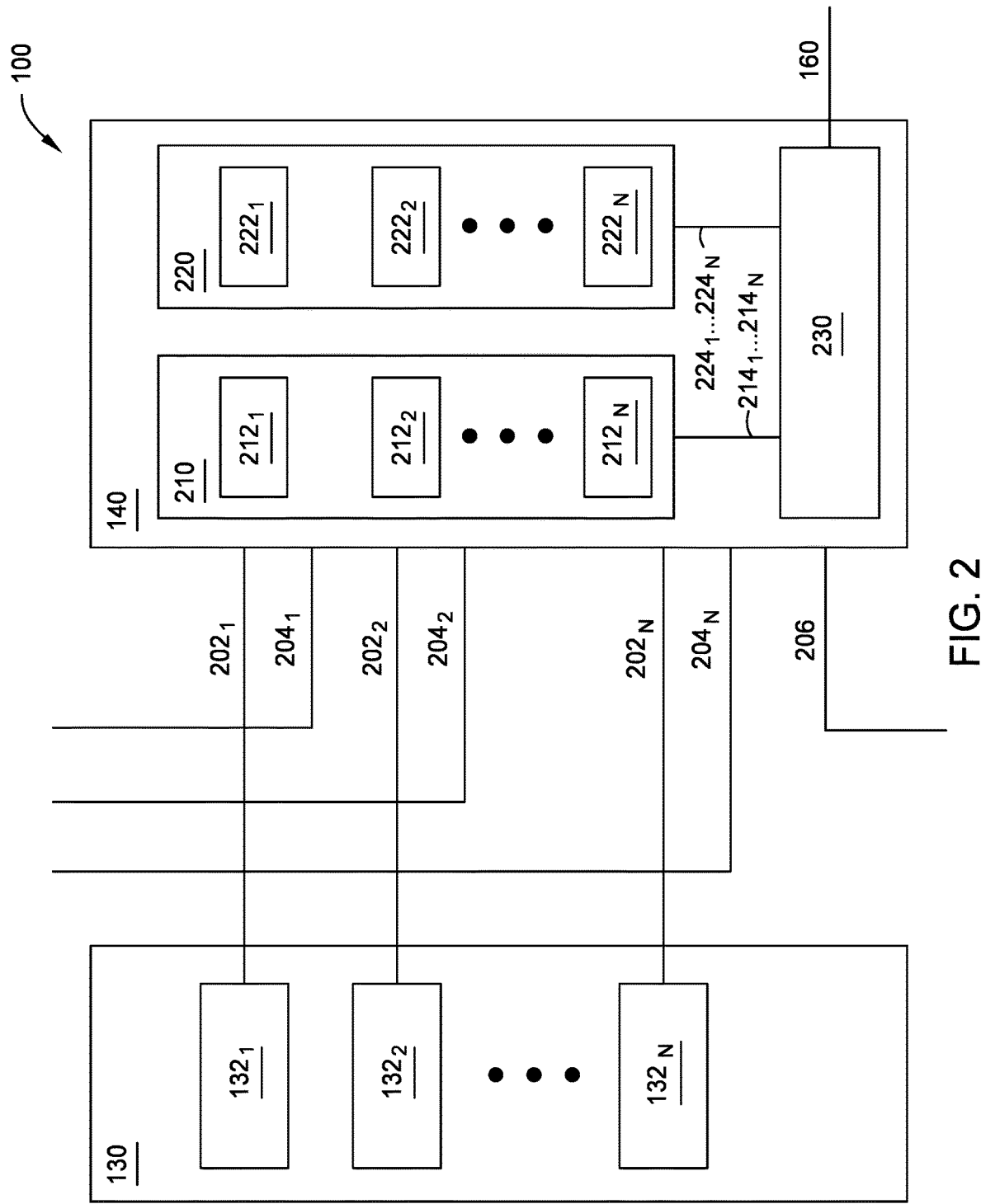
FIG. 2 is a partial schematic diagram of an integrated circuit device, according to an example.

FIG. 2 illustrates a portion of the IC device 100, according to one or more examples. For example, FIG. 2 illustrates the register block 130 and the parity checking circuitry 140. The register block 130 includes registers $132_1$-$132_N$. N is an integer greater than one. For example, N is 8, 16, 32, 64, 138, 256, or more. Each of the registers 132 stores M bits (e.g., M values). M is 2 or more. For example, M is 4, 8, 16, 32, 64, 128, 256, or more.

Each of the registers 132 is connected to the parity checking circuitry 140. The parity checking circuitry 140 includes parity compute circuitry 210 and 220 and error detection circuitry 230. The parity compute circuitry 210 and 220 are similar to each other. For example, the parity compute circuitry 210 includes parity circuits 212, and the parity compute circuitry 220 includes parity circuits 222. In one example, the parity compute circuitry 210 includes parity circuits $212_1$-$212_N$, and the parity compute circuitry 220 includes parity circuits $222_1$-$222_N$. N is an integer greater than one. For example, N is 8, 16, 32, 64, 138, 256, or more.

Each of the parity circuits 212 and 222 determines a corresponding value 214, 224 from the register values of a corresponding register 132 of the register block 130. In one example, each of the parity circuitry 212 determines a value 214 for a first respective bit of each of the registers 132. For example, the parity circuit $212_1$ determines the value $214_1$ from bit[1] of each of the registers 132. Further, the parity circuit $212_2$ determines the value $214_2$ from bit[2] of each of the registers 132. Additionally, the parity circuit $212_N$ determines the value $214_N$ from bit[N] of each of the registers 132. Further, each of the parity circuitry 222 determines a value 224 for a first respective bit of each of the registers 132. For example, the parity circuit $222_1$ determines the value $224_1$ from bit[1] of each of the registers 132. Further, the parity circuit $222_2$ determines the value $224_2$ from bit[2] of each of the registers 132. Additionally, the parity circuit $222_N$ determines the value $224_N$ from bit[N] of each of the registers 132. Such a scheme for determining the values 214 and 224 may be referred to as a vertical parity scheme. Further, each of the parity circuits 212 and 222 determines a value based on a register value from each register 132. In other examples, each parity circuitry 212 and 222 may determine a value from the register values 202 of a respective register 132. In one example, a first parity circuit (e.g. the parity circuit $212_1$) receives register values (e.g., the register values 202) and compares the register values to determine a first value. The register values may include one or more bits of one or more of the registers 132. Determining the first value is further described with regard to FIG. 3.

Each parity circuit 212 and 222 compares respective register values to determine a respective value. Each of the parity circuits 212 and each of the parity circuits 222 are connected to the registers 132. In one example, each parity circuit 212 and each parity circuit 222 is connected to two or more of the registers 132. In one specific example, each parity circuit 212 and each parity circuit 222 is connected to each of the registers 132. In one or more examples, each of the parity circuits 212 and each of the parity circuits 222 are connected to a respective subset of the registers 132, where the subset includes one or more of the registers 132.

In one example, the number of registers 132 is equal to or greater than the number of parity circuits 212 and the number of parity circuits 222. In such an example, each of the parity circuits 212 and 222 receives a bit from each of the registers 132. The parity circuits 212 and 222 function in a vertical parity checking scheme. In another example, the number of registers 132 is less than the number of parity circuits 212 and the parity circuits 222. In such an example, each of the parity circuits 212 receives bits from a respective one of the registers 132 and each of the parity circuits 222 receives bits from a respective one of the registers 132.

The parity circuits 212 and 222 function in pairs such that one of the parity circuits 212 and one of the parity circuits 222 receive the same register values from the same register. In such examples, pairs of the parity circuits 212 and 222 process the same register values to determine a corresponding value 214, 224. Further, the pairs of the parity circuits 212 and 222 receive the same mask 204.

The masks 204 are received from the controller 110 or the control circuitry 120. The masks 204 are received from a memory within the IC device 100. In one example, the masks 204 are stored within a register of the IC device 100. The controller 110 provides the masks 204 to the control circuitry from the memory or register of the IC device 100. The masks 204 identify which of the bits of the register values 202 are used by the parity circuits 212 and 222 to determine a value 214, 224. For example, the masks 204 set one or more of the register values 202 to a predetermined value (e.g., 1 or 0), such that it does not affect the parity calculation performed by a corresponding parity circuit 212 and 222. Each mask 204 has a number of bits equal to the number of registers 132. For example, the mask $204_1$ and includes a value (e.g., bit) for each of the register values 202, the mask $204_2$ includes a value (e.g., bit) for each of the register values 202, and the mask $204_N$ includes a value (e.g., a bit) for each of the register values 202. In one example, the masks 204 correspond to read-write fields, or fields where the value written to a register is predicable, within the registers 132 of the register block 130. The masks 204 may be used to exclude bits within a register 132 that may unpredictable (e.g., having a value that may vary unknowingly the parity checking circuitry 140). In one or more examples, the masks 204 may be hardcoded.

In one example, the parity circuit $212_1$ receives a first one or more bits from the register values $202_1$-$202_N$ from the registers $132_1$-$132_N$, the parity circuit $212_2$ receives a second one or more bits from the register values $202_1$-$202_N$ from the registers $132_1$-$132_N$, and the parity circuit $212_N$ receives a third one or more bits from the registers values $202_1$-$202_N$ from registers $132_1$-$132_N$. The parity circuit $212_1$ receives the mask $204_1$, the parity circuit $212_2$ receives the mask $204_2$, and the parity circuit $212_N$ receives the mask $204_N$. The parity circuit $222_1$ receives a first one or more of the register values $202_1$-$202_N$ from the registers $132_1$-$132_N$, the parity circuit $222_2$ receives a second one or more of the register values $202_1$-$202_N$ from the registers $132_1$-$132_N$, and the parity circuit $222_N$ receives a third one or more of the register values $202_1$-$202_N$ from the registers $132_1$-$132_N$. The parity circuit $222_1$ receives the mask $204_1$, the parity circuit $222_2$ receives the mask $204_2$, and the parity circuit $222_N$ receives the mask $204_N$.

Each parity circuit 212 and 222 determines a corresponding value 214, 224 from the corresponding register values 202 and mask 204. The parity circuit $212_1$ determines the value $214_1$ from a first bit of the register values $202_1$-$202_N$ and the mask $204_1$. The parity circuit $212_2$ determines the value $214_2$ from a second bit of the register values $202_1$-$202_N$ and the mask $204_2$. The parity circuit $212_N$ determines the value $214_N$ from a third bit of the register values $202_1$-$202_N$ and mask $204_N$. The parity circuit $222_1$ determines the value $224_1$ from a first bit of the register values $202_1$-$202_N$ and the mask $204_1$. The parity circuit $222_2$ determines the value $224_2$ from a second bit of the register values $202_1$-$202_N$ and the mask $204_2$. The parity circuit $222_N$ determines the value $224_N$ from a third bit of the register values $202_1$-$202_N$ and mask $204_N$.

The error detection circuitry 230 receives the values 214 and 224 from each of the parity circuits 212 and 222. The error detection circuitry 230 determines the error signal 160 from the values 214 and 224. In one example, the error detection circuitry 230 processes the values 214 and 224 to determine the error signal 160. In one example the error detection circuitry 230 determines the error signal 160 based on the monitor signal 206 being enabled and halts processing of the values 214 and 224 to determine the error signal 160 based on the monitor signal 206 being disabled. The monitor signal 206 is received from the controller 110 or the control circuitry 120 and is generated (e.g., enabled or disabled) by the controller 110 or the control circuitry 120.

In one example, a monitor signal is received by each of the parity circuits 212 and 222. In such an example, one or more of the parity circuits 212 and 222 are disabled while a second one or more of the parity circuits 212 and 222 are enabled. A monitor signal may correspond to one or more registers 132. In an example, where a monitor signal corresponds to two or more registers 132 (e.g., a group of the registers 132), one or more parity circuits 212 and one or more of the parity circuits 222 receive the same monitor signal. Further, in such an example, the monitoring function of multiple registers 132 is disabled at the same time, such that multiple registers 132 may be written (e.g., changed or updated) during a common period. The enabled parity circuits 212 and 222 monitor the values of the registers 132 while the disabled parity circuits 212 and 222 pause monitoring the values of the registers 132. Accordingly, when a parity circuit 212 and/or 222 is disabled, the disabled parity circuit does not generate a value to be used by the error detection circuitry 230 to detect invalid values within the registers 132 that the disabled parity circuits 212 and 222 are monitoring.

In one or more examples, monitoring of the registers 132 via the parity circuits 212 and 222 may be controlled such that the registers 132 are monitored independently from each other. In such examples, multiple monitor signals are used to independently control the monitor functions of the parity circuits 212 and 222. In one example, the parity circuits 212, 222 associated with a first one or more registers 132 are enabled based on a first one or more monitor signals, while the parity circuits 212 and 222 associated with a second one or more registers 132 are disabled based on a second one or more monitor signals. Accordingly, the first one or more registers 132 are monitored by the parity circuits 212 and 222 while the second one or more registers 132 are not monitored and values of the second one or more registers 132 can be updated.

In one example, two or more of the parity circuits 212 receive corresponding register values 202 and a mask 204, and generate corresponding values 214 during at least partially overlapping periods. For example, one or more of the parity circuits 212 generates a value 214 during a period that at least partially overlaps with when one or more of the parity circuits 222 generates a value 224. In other examples, two or more of the parity circuits 212 receive corresponding register values 202 and a mask 204, and generate corresponding values 214 during non-overlapping periods. In one example, the parity circuits 212 generate values in pipeline fashion.

In one example, the parity checking circuitry 140 operates in the clock domain of the controller 110. In another example, the parity checking circuitry 140 operates in the clock domain of the registers 132. In one or more examples, the parity checking circuitry 140 operates in other clock domains. In an example where the parity checking circuitry 140 operates in the clock domain of the registers 132, the registers 132 output the output values 202 directly to the parity checking circuitry 140. In other examples, the parity checking circuitry 140 and one or more of the registers 132 operate in different clock domains. In such an example, the parity checking circuitry 140 monitors the outputs of synchronizer circuitry coupled to the registers 132. For example, the parity checking circuitry 140 receives the register values 202 output by the synchronizer circuitry coupled to the registers 132.

Figure 3:
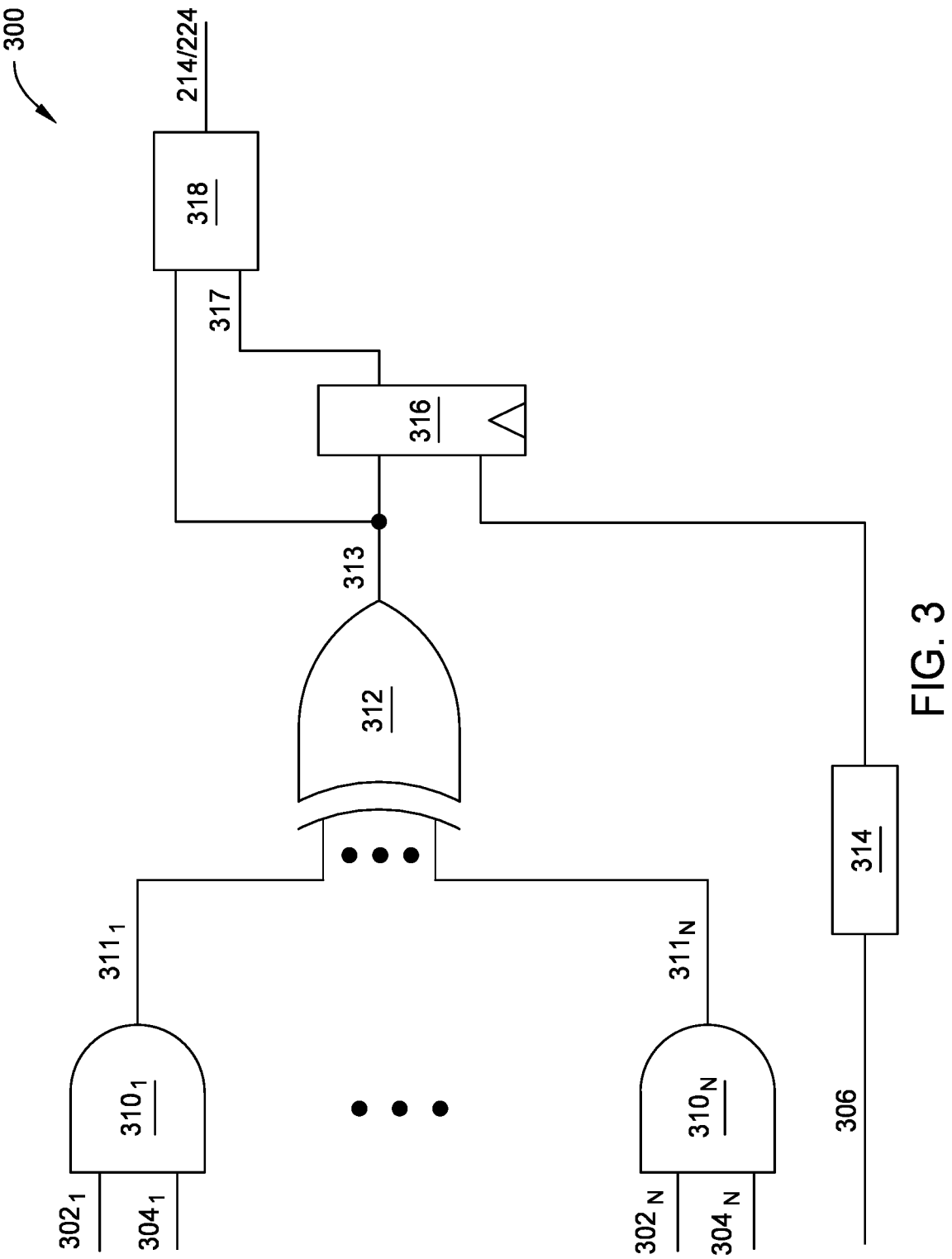
FIG. 3 is a schematic diagram of a parity circuit, according to an example.

FIG. 3 illustrates a schematic circuit diagram of a parity circuit 300, according to one or more examples. The parity circuits 212 and 222 of FIG. 2 may be configured similar to that of the parity circuit 300. In one example, the parity circuit 300 receives register values 302 from registers (e.g., one or more of the registers 132) and determines a value (e.g., value 214 or value 224) from the register values. The parity circuit 300 includes AND gates 310, XOR gate 312, a synchronizer circuit 314, a latch circuit 316, and a comparison circuit 318. In one or more examples, other logic gates may be used alternatively to the logic gates illustrated in FIG. 3. For example, NAND gates may be used instead of the AND gates 310 and/or 318.

Each AND gate 310 receives a respective register value (e.g., register bit) from one or more registers and a value (e.g., mask bit) of a mask. For example, the AND gate $310_1$ receives a first register value (e.g., register value $302_1$) of register values 302 and a first mask value (e.g., mask bit $304_1$) of a mask 304. The register values 302 correspond to one or more of the register values $202_1$-$202_N$ of FIG. 2, and the mask 304 corresponds to one of the masks $204_1$-$204_N$ of FIG. 2. In one example, the register values 302 correspond to register values of a subset of the registers 132.

Each AND gate 310 generates a signal 311 based on a comparison of a register value and a mask value. Further, each AND gate 310 receives a bit from each of the registers 132. For example, each AND gate 310 receives a bit in the same position of the values 202 of each of the registers 132. For example, the AND gate $310_1$ receives a first bit of the values $202_1$. Further, the AND gate $310_N$ receives a first bit of the values $202_N$. In one example, the register block 130 includes an array of registers 132 including a plurality of bits. In such an example, each AND gate 310 receives a bit from each register 132, where each bit is in the same position within each register 132.

The signals 311 may be referred to as intermediate values. In one example, the AND gate $310_1$ generates the signal $311_1$ based on the register value $302_1$ (e.g., a first bit of the register values $202_1$) and the mask bit $304_1$, and the AND gate $310_N$ generates the signal $311_N$ based on the register value $302_N$ (e.g., first bit of the register values $202_N$) and the mask bit $304_N$. The AND gate $310_1$ generates the signal $311_1$ with a logic value of 1 based on the register value $302_1$ and the mask bit $304_1$ having a logic value of 1, and generates the signal $311_1$ with a logic value of 0 based on the register value $302_1$ and/or the mask bit $304_1$ having a logic value of 0. In one example, a mask bit $304_1$ having a logic value of 0 generates an output of the AND gate $310_1$ with a logic value of 0. The values of the mask 304 correspond to the type of data stored within the corresponding register.

The AND gate $310_N$ generates the signal $311_N$ with a logic value of 1 based on the register value $302_N$ and the mask bit (e.g., value) $304_N$ having a logic value of 1, and generates the signal $311_N$ with a logic value of 0 based on the register value $302_N$ and/or the mask bit $304_N$ having a logic value of 0. For example, a mask bit $304_N$ having a logic value of 0 generates an output of the AND gate $310_N$ with a logic value of 0.

In various examples, selectively setting the bits of the mask 304 to a logic value 0 controls the output of the AND gate 310 to have a logic value of 0. Accordingly, the mask values are able to control the logic values of the signals 311 that are used in the following parity calculations.

The signals 311 are output to the XOR gate 312. The XOR gate outputs a signal 313 based on a comparison of the signals 311. For example, the XOR gate outputs the signal 313 having a logic value of 1 when the number of signals 311 having a logic value of 1 is odd and a logic value of 0 when the number of signals 311 having a logic value of 1 is even. The signal 313 may be referred to as an intermediate value. In one example, the signal 313 may be referred to as the parity signal in real time. In an example where there are only two input signals to the XOR gate and the input signals have the same value, either a logic value of 0 or 1, the signal 313 has a logic value of 0, and when the signals $311_1$ and $311_N$ have different values (e.g., either a logic value of 0 or 1), the logic value of the signal 313 is 1. The signal 313 is output to the latch circuit 316 and the comparison circuit 318.

The synchronizer circuit 314 receives a monitor signal 306 and monitors the monitor signal 306 to enable or disable the latch circuit 316 from outputting the signal 317. The synchronizer circuit 314 enables the latch circuit 316 to output the signal 317 based on the monitor signal 306 being asserted and disables the latch circuit 316 from outputting the signal 317 based on the monitor signal 306 being deasserted. Accordingly, the monitor signal 306 is able to enable or disable the corresponding monitoring function. The signal 317 is referred to as the parity signal or a golden parity value. The signal 317 is the valid parity value (e.g., a known good parity value) for the parity circuit 300 and corresponding registers 132. For example, the logic value of the signal 317 is the valid parity value for the corresponding register 132 or subset of registers 132. The signal 317 is based on the value of a corresponding register 132. In one example, the value of the signal 317 may be received from the controller 110 or the control circuitry 120, or determined from a value or values stored in a corresponding register. In one example, the value of the signal 317 is determined based on a value of the corresponding register or registers 132 when the monitor signal 306 enables (e.g., a rising edge of monitor signal) the monitoring function of the corresponding register or registers 132.

The monitor signal 306 is received by the parity circuit 300, and the parity circuit 300 determines when to monitor the corresponding register or registers 132 based on the value of the monitor signal 306. In one example, the synchronizer circuit 314 is omitted, and the monitor signal 306 is received by the latch circuit 316, to enable or disable the monitoring function of the parity circuit 300. In such an example, the monitor signal 306 is in a clock domain of the parity circuit 300.

The comparison circuit 318 receives the signal 313 and 317 and outputs a logic value of 1 when the signal 313 and the signal 317 both have the same value, and a logic value of 0 when the signal 313 and the signal 317 have different values. The comparison circuit 318 generates the value 214 or the value 224 indicating that there is an error within the register values 302 based on the signal 313 and the signal 317 not being equal to each other. Further, the comparison circuit 318 generates the value 214 or the value 224 indicating that register values 302 are error free based on the signal 313 and the signal 317 being equal to each other. The value 214 or the value 224 is output to error detection circuitry (e.g., the error detection circuitry 230 of FIG. 2)

Figure 4:
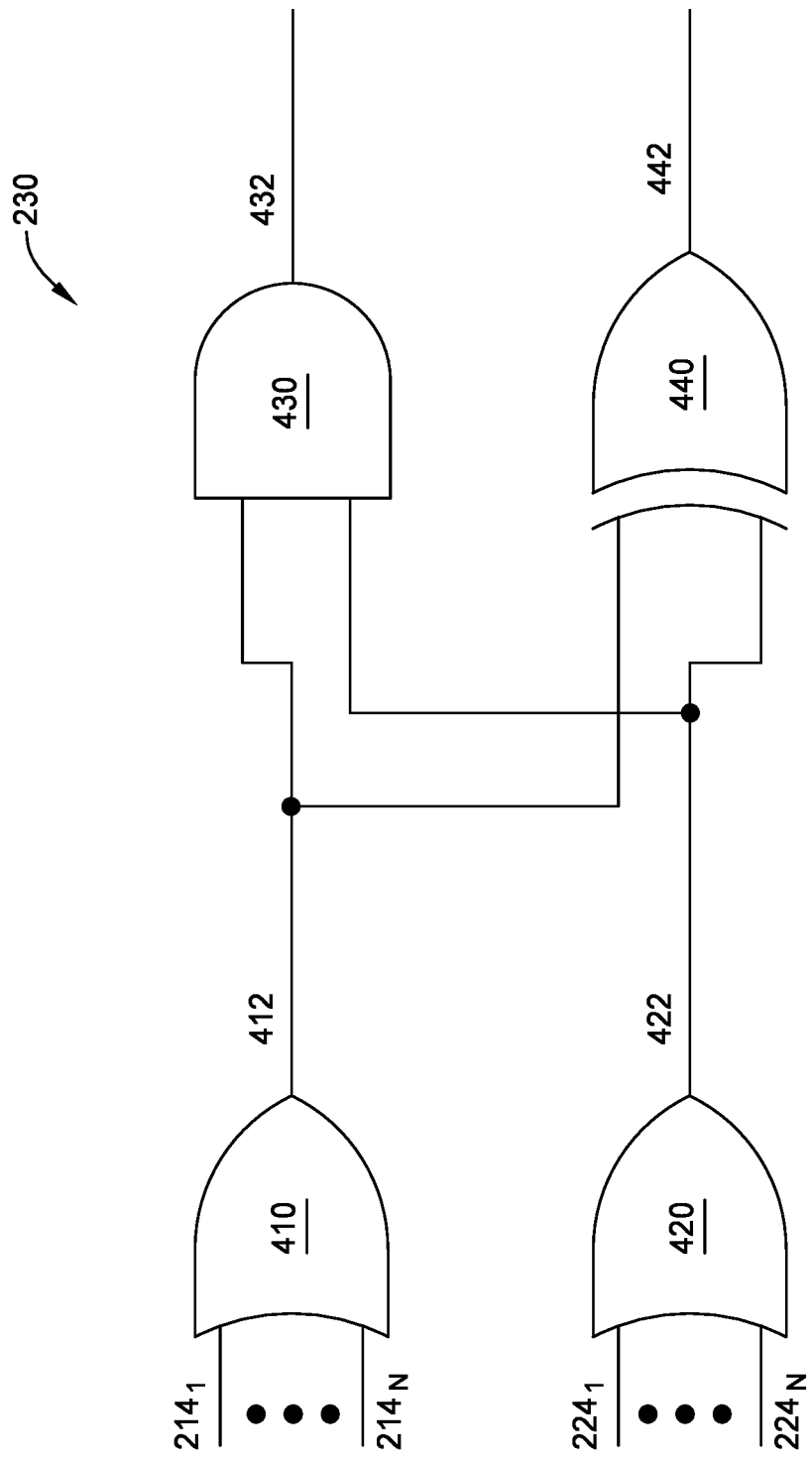
FIG. 4 is a partial schematic diagram of an error detector circuit, according to an example.

FIG. 4 illustrates a schematic circuit diagram of the error detection circuitry 230, according to one or more examples. In one example, the error detection circuitry 230 receives values 214 and the value 224 and determines an error within registers (e.g., the registers 132 of FIG. 2) and/or an error within parity checking circuitry (e.g., the parity checking circuitry 140) based on a comparison of the values. The error detection circuitry 230 includes an OR gate 410, an OR gate 420, an AND gate 430, and an XOR gate 440. In one or more examples, other logic gates may be used as an alternative to the logic gates illustrated in FIG. 4. For example, NAND gates may be used instead of the AND gate.

The OR gate 410 receives a value 214 from each of the parity circuits 212, and the OR gate 420 receives a value from each of the parity circuits 222. The values 214 and the values 224 are determined similar to how the value 214 is determined with regard to the description of FIG. 3.

The OR gate 410 generates a signal 412 based on a comparison of the values 214. For example, the OR gate generates the signal 412 with a logic value of 1 based on one or more of the values 214 having a logic value of 1 and the signal 412 with a logic value of 0 based on each of the values 214 having a logic value of 0. Accordingly, if one or more of the values are indicative of an error (e.g., have a logic value of 1), the OR gate 410 generates the signal 412 with a logic value of 1 indicating that an error was detected.

The OR gate 420 generates a signal 422 based on a comparison of the values 224. For example, the OR gate 420 generates the signal 422 with a logic value of 1 based on one or more of the values 224 having a logic value of 1 and the signal 422 with a logic value of 0 based on each of the values 224 having a logic value of 0. Accordingly, if one or more of the values are indicative of an error (e.g., have a logic value of 1), the OR gate 420 generates the signal 422 with a logic value of 1 indicating that an error was detected.

The AND gate 430 receives the signals 412 and 422 and generates a signal 432 based on a comparison of the signals 412 and 422. For example, the AND gate generates the signal 432 with a logic value of 1 when both of the signals 412 and 422 have a logic value of 1. The AND gate 430 generates the signal 442 with a logic value of 0 based on one or more of the signals 412 and 422 having a logic value of 0.

The XOR gate 440 receives the signals 412 and 422 and generates a signal 442 based on a comparison of the signals 412 and 422. For example, the XOR gate generates the signal 442 with a logic value of 1 when only one of the signals 412 and 422 has a logic value of 1. The XOR gate 440 generates the signal 442 with a logic value of 0 based on the signals 412 and 422 having the same logic value (e.g., either a logic value of 1 or 0).

In one example, the parity compute circuitry 220 and the error detection circuitry 230 determine whether or not faults exist within the parity checking circuitry 140. For example, as is noted above, the parity compute circuitry 220 is configured the same as the parity compute circuitry 210 and receives the same data (e.g., register values 202 and masks 204). The parity compute circuitry 220 may be referred to as being redundant to the parity compute circuitry 210. Accordingly, if the parity checking circuitry 140 is fault free, the signals 412 and 422 have the same value. If there are one or more faults within the parity checking circuitry 140, the signals 412 and 422 have different values. Accordingly, the combination of the AND gate 430 and the XOR gate 440 provides a two-bit error signal 160 including the bits corresponding to the signals 432 and 442.

The value of the signal 442 is used to determine if the signals 412 and 422 are the same (e.g., error free). For example, when the logic value of the signal 432 is 0 and the logic value of the signal 442 is 0, the signals 412 and 422 both have a logic value of 0. Accordingly, no errors were detected within the corresponding IC device. Further, when the logic value of the signal 432 is 0 and the logic value of the signal 442 is 1, the signals 412 and 422 have different values. Accordingly, the signal 432 having a logic value of 0 and the signal 442 having a logic value of 1 is indicative of the parity checking circuitry 140 having one or more faults.

The signals 432 and 442 are output from the IC device (e.g., the IC device 100 of FIG. 1) as bits of the error signal 160. The error signal 160 is provided to a processing system that determines what corrective actions to take, if any. In one example, the first bit of the error signal 160 corresponds to the logic value of the signal 432. Based on the first bit having a logic value of 1, an error in the register values is determined, and the processing system stops operation of the IC device 100, resets the IC device 100, or changes the register values of the IC device 100, among other actions. The second bit of the error signal 160 corresponds to the logic value of the signal 442. Based on the first bit having a logic value of 0 and the second bit having a logic value of 1, the processing system determines that one or more faults exist within the parity checking circuitry 140 and stops operation of the IC device 100, resets the IC device 100, or resets the values of the parity checking circuitry 140, among other actions. Based on the first bit having a logic value of 0 and the second bit having a logic value of 0, the processing system determines that the register values and the parity checking circuitry 140 are error free, and no corrective action is taken.

Figure 5:
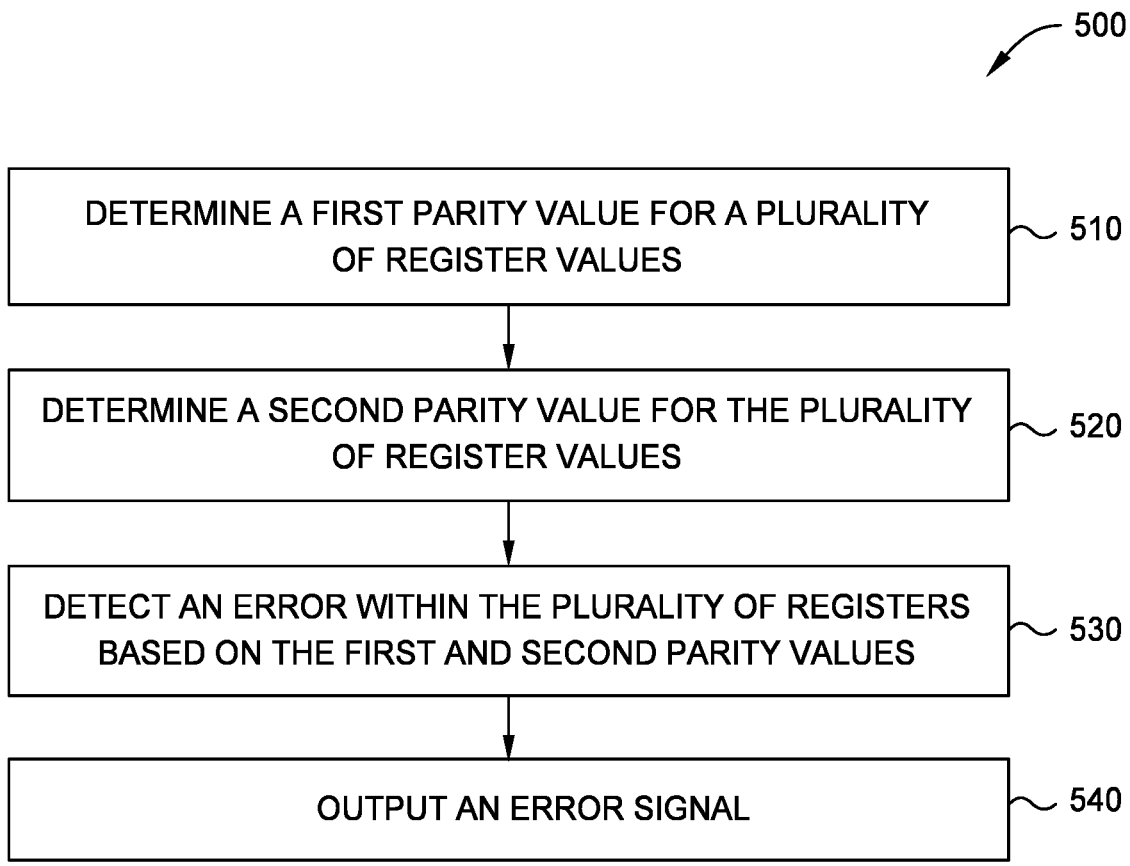
FIG. 5 is a flow chart of a method for detecting errors within registers, according to an example.

FIG. 5 illustrates a flow chart of a method 500 for detecting errors within register values of a register block, according to one or more examples. FIG. 5 is described with reference to FIG. 2-FIG. 4. At block 510, a first value for a subset of registers values of the registers is determined. For example, the parity circuit $212_1$ receives one or more bits (e.g., values) from each of the register values $202_1$-$202_N$ from the registers $132_1$-$132_N$. Further, the parity circuit $212_1$ receives the mask $204_1$. The mask $204_1$ is received from a controller (e.g., the controller 110 of FIG. 1) or control circuitry (e.g., the control circuitry 120 of FIG. 1). The parity circuit $212_1$ compares each a bit (e.g., value) of each of register values $202_1$-$202_N$ to the values of the mask $204_1$ to determine which of the register values are to be used in the calculation of the value $214_1$. The values of the mask $204_1$ are used to set corresponding values of register values 202 to a known value (e.g., a value of 1 or 0) for parity calculation. The parity circuit $212_1$ compares (e.g., logically ANDs or another logic operation) a value (a bit) from each of register values $202_1$-$202_N$ with a corresponding value of the mask to generate a plurality of signals (e.g., signals 311) which are compared to each other to determine whether or not the number of the signals that have a value of a logic value 1 is odd or even. In one example, based on determining that the number of the signals having a logic value of 1 is odd, a signal having a logic value of 1 is output, and based on determining that the number of the signals having a logic value of 1 is even, a signal having a logic value of 0 is output. With reference to FIG. 3, this signal is 313. The signal is compared to a corresponding golden parity signal (e.g., signal 317) to determine mismatch and/or a change in parity of the parity circuit $212_1$ and the register $132_1$. In one example, the parity circuit $212_1$ determines the value $214_1$ based on a corresponding monitor signal being asserted. The value has a logic value of 1 when the signals are the same (i.e., registers have valid values) and a logic value of 0 when the signals differ (i.e., a register has an invalid value).

At block 520, a second value for a second register subset is determined. For example, the parity circuit $212_2$ receives a second value (e.g., second bit) from register values $202_1$-$202_N$ from the registers 132. Further, the parity circuit $212_2$ receives the mask $204_2$. The mask $204_2$ is received from a controller (e.g., the controller 110 of FIG. 1) or control circuitry (e.g., the control circuitry 120 of FIG. 1). The parity circuit $212_2$ compares the second value of each of the register values $202_1$-$202_N$ to the values of the mask $204_2$ to determine which of the register values are to be used in the calculation of the value $214_2$. The values of the mask $204_2$ are used to set corresponding values of the register values 202 to a known value (e.g., a value of 1 or 0) for parity calculation. The parity circuit $212_2$ compares each register value $202_2$ with a corresponding value of the mask to generate a plurality of signals (e.g., signals 311), which are compared to each other to determine whether or not the number of the signals that have a value of a logic value 1 is odd or even. In one example, based on determining that the number of the signals having a logic value of 1 is odd, a signal having a logic value of 1 is output, and, based on determining that the number of the signals having a logic value of 1 is even, a signal having a logic value of 0 is output. With reference to FIG. 3, this signal is signal 313. The signal is compared to a corresponding golden parity signal (e.g., signal 317) to determine mismatch and/or a change in parity of the parity circuit $212_2$ and the register $132_2$. In one example, the parity circuit $212_2$ determines the value $214_2$ based on a corresponding monitor signal being asserted. The value has a logic value of 1 when the signals are the same (i.e., registers have valid values) and a logic value of 0 when the signals differ (i.e., a register has an invalid value).

At block 530, error is detected within the plurality of registers based on the first and second values. For example, error detection circuitry 230 compares the values $214_1$ and $214_2$. If either value $214_1$ and $214_2$ is indicative of an error within the values of the corresponding registers, the parity checking circuitry 140 outputs an error signal 160 indicative of an error at block 540. If both values $214_1$ and $214_2$ are indicative of no errors within the values of the corresponding registers, the parity checking circuitry 140 outputs an error signal 160 that indicates no errors are present within the registers at block 540.

A hardware-based technique for detecting erroneous value changes (e.g., invalid values) to the values in control registers of an IC devices is described above. For example, parity checking circuitry monitors the control registers such that erroneous value changes to the register values are detected before operation of the IC device is adversely affected. The parity checking circuitry generates values for subsets of the registers and uses the values to determine whether or not errors exist within the values of the control registers.

While the foregoing is directed to specific examples, other and further examples may be devised without departing from the basic scope thereof, and the scope thereof is determined by the claims that follow.

What is claimed is:

1. An integrated circuit (IC) device comprising:
a plurality of registers; and
parity checking circuitry coupled to the plurality of registers and comprising:
a first parity circuit configured to receive first register values from the plurality of registers and determine a first value from the first register values, wherein the first register values correspond to first bits of two or more of the plurality of registers, and wherein the first register values have fewer bits than the plurality of registers;
a second parity circuit configured to receive second register values from the plurality of registers and determine a second value from the second register values, wherein the second register values correspond to second bits of the two or more of the plurality of registers; and
error detection circuitry configured to:
compare the first value and the second value to detect a first error within the plurality of registers; and
output an error signal indicating the first error.

2. The IC device of claim 1, wherein the parity checking circuitry further comprises:
a third parity circuit configured to receive the first register values and determine a third value from the first register values; and
a fourth parity circuit configured to receive the second register values and determine a fourth value from the second register values, wherein the error detection circuitry is further configured to detect a second error within the parity checking circuitry based on the first value, the second value, the third value, and the fourth value.

3. The IC device of claim 2, wherein the error detection circuitry is configured to detect the second error by:
generating a first signal based on a comparison of the first value and the second value;
generating a second signal based on a comparison of the third value and the fourth value; and
comparing the first signal and the second signal.

4. The IC device of claim 1, wherein the first parity circuit is configured to determine the first value by applying a mask to the first register values to determine first intermediate values, wherein the mask includes mask values, and wherein each of the first register values corresponds to a respective one of the mask values.

5. The IC device of claim 4, wherein the first parity circuit is further configured to determine the first value by:
determining a second intermediate value based on the first intermediate values; and
comparing the second intermediate value and a valid value.

6. The IC device of claim 1, wherein the parity checking circuitry is configured to determine the first value based on a monitor enable signal.

7. The IC device of claim 1, wherein the first value is determined during a first period and wherein the second value is determined during a second period, the first period and the second period being non-overlapping.

8. A method comprising:
determining, by a first parity circuit of parity checking circuitry of an integrated circuit (IC) device, a first value from first register values of a plurality of registers of the IC device, wherein the first register values correspond to first bits of two or more of the plurality of registers, and wherein the first register values have fewer bits than the plurality of registers;
determining, by a second parity circuit of the parity checking circuitry, a second value from second register values of the plurality of registers, wherein the second register values correspond to second bits of the two or more of the plurality of registers;
comparing the first and second values to determine a first error within the plurality of registers; and
outputting an error signal indicative of the first error.

9. The method of claim 8 further comprising:
determining, by a third parity circuit of the parity checking circuitry, a third value from the first register values;
determining, by a fourth parity circuit of the parity checking circuitry, a fourth value from the second register values; and
determining a second error within the parity checking circuitry based on the first value, the second value, the third value, and the fourth value.

10. The method of claim 9, wherein determining the second error within comprises:
generating a first signal based on a comparison of the first value and the second value;
generating a second signal based on a comparison of the third value and the fourth value; and
comparing the first signal and the second signal.

11. The method of claim 8, wherein determining the first value comprises applying a mask to the first register values to determine first intermediate values, wherein the mask includes mask values, and wherein each of the first register values corresponds to a respective one of the mask values.

12. The method of claim 11, wherein determining the first value further comprises:
determining a second intermediate value based on the first intermediate values; and
comparing the second intermediate value and a valid value.

13. The method of claim 8, wherein detecting the first value is based on a monitor enable signal.

14. The method of claim 8, wherein the first value is determined during a first period, and wherein the second value is determined during a second period, the first period and the second period being non-overlapping.

15. A parity checking circuitry comprising:
a first parity circuit configured to receive first register values from a plurality of registers and determine a first value from the first register values, wherein the first register values correspond to first bits of two or more of the plurality of registers, and wherein the first register values have fewer bits than the plurality of registers;
a second parity circuit configured to receive second register values from the plurality of registers and determine a second value from the second register values, wherein the second register values correspond to second bits of the two or more of the plurality of registers; and error detection circuitry configured to:
compare the first value and the second value to determine a first error within the plurality of registers; and
output an error signal indicating the first error.

16. The parity checking circuitry of claim 15 further comprising:
a third parity circuit configured to determine a third value from the first register values; and
a fourth parity circuit configured to determine a fourth value from the second register values, wherein the error detection circuitry is further configured to determine a second error within the parity checking circuitry based on the first value, the second value, the third value, and the fourth value.

17. The parity checking circuitry of claim 16, wherein the error detection circuitry is configured to determine the second error by:
generating a first signal based on a comparison of the first value and the second value;
generating a second signal based on a comparison of the third value and the fourth value; and
comparing the first signal and the second signal.

18. The parity checking circuitry of claim 15, wherein the first parity circuit is configured to determine the first value by applying a mask to the first register values to determine first intermediate values, wherein the mask includes mask values, and wherein each of the first register values corresponds to a respective one of the mask values.

19. The parity checking circuitry of claim 18, wherein the first parity circuit is configured to determine the first value by:
determining a second intermediate value based on the first intermediate values; and
comparing the second intermediate value and a valid value.

20. The parity checking circuitry of claim 15, wherein the first parity circuit is configured to determine the first value during a first period and wherein the second parity circuit is configured to determine the second value during a second period, the first period and the second period being non-overlapping.

* * * * *